United States Patent Office 2,776,871
Patented Jan. 8, 1957

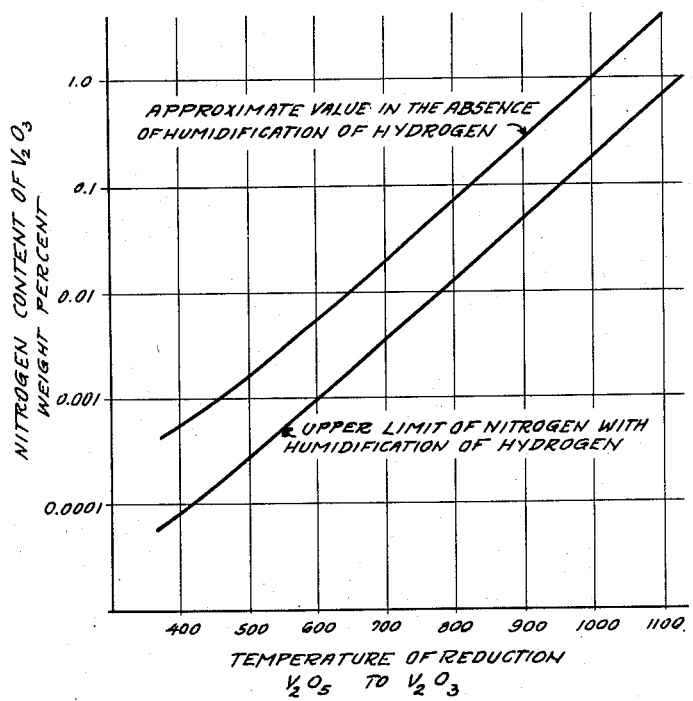

2,776,871

QUALITY OF VANADIUM TRIOXIDE FOR THE MANUFACTURE OF DUCTILE VANADIUM

John C. R. Kelly, Jr., Upper Montclair, N. J., assignor to Westinghouse Electric Corporation, East Pittsburgh, Pa., a corporation of Pennsylvania Original application September 7, 1951, Serial No. 245,595, now Patent No. 2,702,739, dated February 22, 1955. Divided and this application July 8, 1953, Serial No. 366,855

3 Claims. (Cl. 23—140)

This application is a division of my Patent No. 2,702,739, granted February 22, 1955.

This invention relates to vanadium, and more particularly to the production of such metal of an exceptionally high degree of purity, and to an improved method for the manufacture thereof.

The principal object of my invention, generally considered, is to produce vanadium by reaction of a low valance compound thereof, produced by a low-temperature reduction of vanadium pentoxide, with calcium or magnesium, said reaction taking place in a cup enclosed in a container, said container being filled with an inert gas, as distinguished from the prior practice of reducing vanadic oxide in a heavy-walled iron bomb with a ground-in stopper, said bomb being heated in open air.

Another object of my invention is to produce vanadium powder by heating a vanadous or hypo-vanadous compound, produced by a low-temperature reduction of vanadium pentoxide, mixed with calcium and/or magnesium and the chloride of one or a mixture of said metals, by high-frequency induction, the reaction cup being enclosed in a quartz or glass bell jar, that is, one of 96% silica glass, sometimes designated by the Corning trademark "Vycor."

A further object of my invention is to treat the powder, produced in accordance with the above, to consolidate it into coherent metal and form to the desired shape.

A still further object of my invention is to improve the quality of vanadium trioxide by reduction of the nitrogen content thereof.

Other objects and advantages of the invention will become apparent as the description proceeds.

Referring to the drawing:

The sole figure includes two curves, the upper one showing how the nitrogen contamination in the product varies with the temperature of reduction of vanadium pentoxide to vanadium trioxide in the absence of hydrogen humidification, and the lower one showing the beneficial effect of such humidification.

The reduction by calcium of vanadium pentoxide, has previously been accomplished in heavy-wall iron bombs with a ground-in stopper held in place by a screw cap. Such devices have a number of limitations and disadvantages, to wit:

It is difficult to maintain an air-tight joint between the stopper and bomb and to prevent reoxidation of the vanadium powder produced as the bomb cools, or during the heating process. Considerable warping of the bomb occurs during heating and cooling, thus necessitating time-consuming lapping operations between runs. The construction of bombs has been limited to materials which will resist oxidation at elevated temperatures, and iron or iron alloys have been generally used for economy. Bombs were without exception of heavy-walled construction to permit sufficient surface area for sealing and presumably to withstand pressure produced in the reaction.

From thermo-chemical data and a consideration of the products formed in the reaction between vanadium trioxide (or lower valence oxide, such as the dioxide, $V_2O_2$) which the inventors Gregory et al., named in Patent No. 2,653,689, granted September 29, 1953, have substituted for the pentoxide, previously employed, and calcium, they concluded that the pressures developed in the reaction were insufficient to necessitate the heavy-walled bombs previously used. They tested their conclusions by placing an iron cup, lined with non-reactive refractory material, such as CaO or MgO under a "Vycor" (or quartz) bell jar, evacuating the bell jar, and then heating the cup by high-frequency induction to cause the calcium to reduce the vanadium oxide. Vaporization of the calcium was suppressed by filling the jar with argon gas at a pressure slightly less than atmospheric. There was no abnormal pressure produced during the reaction, very little vaporization of calcium, and satisfactory vanadium metal powder was obtained.

The reduction of vanadium pentoxide by calcium is old in the prior art. However, the vanadium so produced, contained substantial quantities of metallic beads, apparently formed from fused metal. Although some of the individual beads were soft and ductile, others were not and the mixture of fine powder and fused beads when pressed and sintered yielded hard and brittle metal compacts. The result has been due to the non-recognition of the importance of controlling both the amount of calcium present and the temperature of the reaction during reduction as embodied in the specification referred to, that is, using from 50% to 150% calcium in excess, over the theoretical required in the reaction, together with calcium chloride, to control localized high temperatures during the reaction.

The inventors in the referred-to application found that the heat of reaction and, therefore, the maximum temperature can be better controlled by employing the oxide of vanadium, or other compound thereof, in which the valence of the vanadium is less than four, together with the addition of carefully dehydrated calcium chloride or magnesium chloride to the charge of oxide and calcium and/or magnesium. By reducing the heat of the reaction by using a lower valence compound of vanadium and by diluting the charge with calcium chloride, they have been able to produce consistently a non-pyrophoric vanadium powder substantially all of which is usable for the production of coherent ductile vanadium by the powder metallurgy process.

The vanadous or hypo vanadous oxide, or other compound of vanadium to be employed, in which the valence of vanadium is not more than three, may be prepared, if not procurable by purchase, from pure vanadium pentoxide, ammonium metavanadate, $NH_4VO_3$, or other vanadic compound containing no harmful constituent, by hydrogen reduction at 500° C. to 1000° C., as in a metal or ceramic boat in a refractory tube furnace.

However, it is a well-known fact that oxygen and nitrogen present in the lattice structures of certain metals will result in excessive values of hardness, poor ductility, and difficult workability. It is usually accepted that nitrogen is the more serious contaminant and, in the case of vanadium, this has been experimentally shown to be true. In addition, the corrosion resistance of a metal is dependent upon the degree of contamination by these two elements. Again nitrogen appears as the more serious offender.

The basic operations involved in the disclosure of the aforementioned application are these:

(a) Reduction of vanadium pentoxide to vanadium trioxide with hydrogen gas at elevated temperatures.

$$(500°-1000° \text{ C.})$$
$$V_2O_5 + 2H_2 = V_2O_3 + 2H_2O \qquad (1)$$

(b) Reduction of vanadium trioxide to vanadium metal powder with molten calcium metal at elevated temperatures.

$$(900°-1350° \text{ C.})$$
$$V_2O_3 + 3Ca + (CaCl_2) \rightarrow 2V + 3CaO + (CaCl_2) \qquad (2)$$

The present improvement is concerned with variations and/or amendments to the product of step (a) to reduce the nitrogen content. As previously performed, dry commercial hydrogen was admitted to the reaction furnace and the reduction adjudged complete at such time as the product conforms to the properties of vanadium trioxide. However, this product is frequently found to contain higher percentages of nitrogen than would be the expected from consideration of the nitrogen content of the pentoxide. This may be ascribed to the fact that commercial hydrogen contains in excess of 0.1 volume percent of nitrogen. This nitrogen is combined with hydrogen to form ammonia on the surface of oxides of vanadium. Vanadium trioxide reacts readily with ammonia according to:

$$V_2O_3 + 2NH_3 \rightleftharpoons 2VN + 3H_2O \qquad (3)$$

I have determined theoretically that this reaction will produce a vanadium trioxide which will contain quantities of nitrogen in direct relation to the temperature of the reduction illustrated by Equation 1. Briefly it may be stated that vanadium pentoxide reduced at 1000° C. in commercial hydrogen will produce trioxide containing 0.1% by weight of nitrogen. If the same reaction is caused to occur at 600° C. the resulting trioxide will contain less than 0.001% nitrogen. This is shown graphically in the sole figure, lower curve.

Therefore, during the normal reduction in accordance with Equation 1, sufficient nitrogen passes over the $V_2O_3$ to contaminate it to the maximum extent permitted by the equilibrium of the equation $$N_2 + 3H_2 + V_2O_3 \rightleftharpoons 2VN + 3H_2O \qquad (4)$$

Knowing that nitrogen is deleterious to vanadium metal, and knowing that most of the nitrogen in $V_2O_3$ is carried over in the calcium reduction of the trioxide to produce a metal contaminated with nitrogen, the equilibrium of Equation 4 was studied theoretically and the findings illustrated in the curves of the sole figure were verified analytically.

It was evident that the temperature of reduction was critical and should be maintained below 650° C. or between 450° and 650° C., in order to keep the nitrogen in the ultimate metal product to the lowest possible concentration. The melting points of the tri- and pentoxides are above 650° C., and therefore, more efficient reduction might also be expected below this temperature, as without the complication of a molten phase.

Further consideration of Equation 4 showed that the principle of Le Chatelier-Braun (mass-action) could be applied, since increasing the concentration of $H_2O$ on the right hand side of said Equation 4 will decrease the equilibrium concentration of VN, thereby further eliminating nitrogen. Thus the dewpoint of the hydrogen should be specified as above 0° C. and preferably from 40° to 60° C. It thus contains more than 4.8 and preferably from 51.1 to 130.5 mg. of water per liter, according to "Properties of Saturated Steam," "Handbook of Chemistry and Physics," 28th Edit., Chemical Rubber Publishing Co., 1944. Hydrogen received from factory sources is usually dried to −30° C. A combination of controlled reduction temperature, and controlled humidity of hydrogen is, therefore, the preferred embodiment, although the separate use of either feature involves an improvement over prior practice. For example, the mere humidification of the hydrogen used in the practice of the invention of the Gregory et. al. application, previously referred to, is beneficial.

Improvement in the quality of $V_2O_3$, initially high in nitrogen as received from supplier or as prepared, may be accomplished by heating to 650° C. or less under the same humidity conditions as proposed in the preceding paragraph, using hydrogen, argon, or helium as a carrier gas for the water vapor.

Vanadium metal produced from the purer trioxide by step (b) of the previous disclosure has been found to be softer than any previous product ($VPN_{30}$ (Vickers Pyramid No. with a 30 kg. load) <150 vs. 240) ($Rockwell_B$ 81 vs. $Rockwell_B$ 100) and it may be formed at room temperature, whereas the previous product must be elevated to 600° C. in an inert atmosphere and formed gradually with frequent reheating.

The above may be amplified by the following tabular information:

Table I

| If $V_2O_3$ is reduced at ° C. indicated below | It will contain below percent by wt. nitrogen | And the resulting metal could contain below percent by wt. of nitrogen |
|---|---|---|
| 600 | 0.001 | 0.0015 |
| 700 | 0.003 | 0.0045 |
| 900 | 0.05 | 0.075 |
| 1,000 | 0.18 | 0.27 |

Thus the vanadium metal will be more seriously contaminated than is indicated by the figure which refers to $V_2O_3$.

The lower curve of the figure represents an equilibrium of ideal conditions, i. e., properly humidified hydrogen and controlled temperatures. Actually, the two curves indicate the fact that:

(a) Without humidification, temperature control is effective since the upper curve will have the same favorable slope, but will be displaced to higher values of nitrogen content.

(b) With humidification of the hydrogen, the lower curve represents appropriate upper limits for nitrogen content.

Lower or vanishing values of nitrogen content may, of course, be obtained provided the vanadium pentoxide used is free of nitrogen and the hydrogen used for reduction is of extreme purity. However, the prices of such extremely pure reagents are prohibitive.

Although a preferred embodiment has been described, it will be understood that modifications may be made within the spirit and scope of the invention. For example, although we have specifically considered the preparation of only vanadium trioxide and its improvement by water vapor, I do not wish to be limited to this compound for, as previously explained, similar considerations apply to oxides, such as the dioxide, $V_2O_2$, in which the vanadium has a valence of less than four.

Also, if it were desired to eliminate vanadium nitride from the dioxide, or other vanadous or hypo-vanadous compound, Equation 4 would apply in its improvement by the use of water vapor, except that the vanadium nitride upon being denitrided would appear as the dioxide or other vanadous or hypo-vanadous compound, on the left hand side of the equation, rather than the trioxide. In the same way, Equation 2 is applicable, using such vanadous or hypo-vanadous compound other than the trioxide, the amount of the calcium, or other reducing element, and the chloride being changed proportionately to agree with the lower oxide ratio in the compound being reduced.

I claim:
1. The method of improving the quality of vanadium trioxide with regard to nitrogen content, comprising placing the vanadium trioxide in a reaction chamber maintained at a temperature between a maximum of 650° C. and 350° C., while subjecting said trioxide to the action of water vapor at a dew point between 0° C. and 60° C. in a carrying current of hydrogen to which said vanadium trioxide is substantially inert.

2. The method of removing nitrogen from a vanadium oxide, selected from the group consisting of vanadous and hypo-vanadous oxides, and high in nitrogen content, comprising placing the vanadium oxide in a reaction chamber maintained at a temperature between a maximum of 650° C. and 350° C., while subjecting said oxide to the action of water vapor at a dew point between 0° C. and 60° C. in a carrying current of hydrogen to which said oxide is substantially inert.

3. The method of removing nitrogen from a vanadium oxide, selected from the group consisting of vanadous and hypo-vanadous oxides, comprising subjecting said oxide to the action of water vapor at a dew point between 0° C. and 60° C. in a carrying current of hydrogen, while maintained at a temperature between 350° C. and 650° C.

References Cited in the file of this patent

UNITED STATES PATENTS 866,421   Becket _____ Sept. 17, 1907

OTHER REFERENCES

Mellor: "Comprehensive Treatise on Inorganic and Theoretical Chemistry," vol. 9, Longmans, Green and Co., N. Y., 1929, pages 739, 741.